Aug. 30, 1932. H. T. MASER 1,874,777
ELECTRIC POWER CONTROL APPARATUS
Filed Aug. 26, 1930
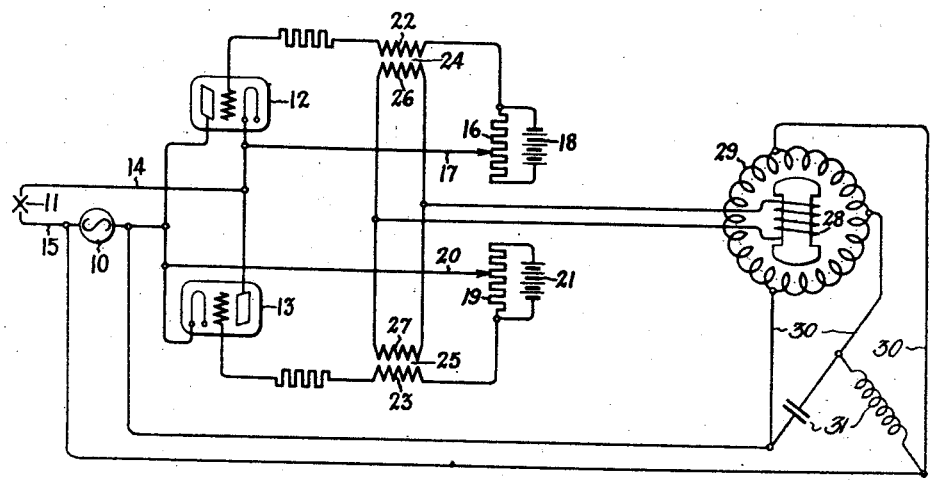
Inventor:
Harold T. Maser,
by Charles V. Mullan
His Attorney.

Patented Aug. 30, 1932

1,874,777

UNITED STATES PATENT OFFICE

HAROLD T. MASER, OF SCHENECTADY, NEW YORK, ASSIGNOR TO GENERAL ELECTRIC COMPANY, A CORPORATION OF NEW YORK

ELECTRIC POWER CONTROL APPARATUS

Application filed August 26, 1930. Serial No. 477,935.

My invention relates to electric power control apparatus, and more particularly to apparatus for controlling the flow of electric energy from a source of alternating current by the use of electric discharge devices.

Heretofore various types of apparatus including electric discharge devices have been proposed for controlling the interchange of electric energy between alternating current and direct current systems. My invention relates to this general type of apparatus and has for its principal object to increase the flexibility of control.

Another object of my invention is to provide an improved apparatus for controlling the magnitude of the current delivered from a source of alternating current.

A further object of my invention is to provide an improved apparatus for controlling rectification of power in either direction from a source of alternating current.

A still further object of my invention is to provide improved means to control the magnitude of the current delivered by a source of alternating current and at the same time provide means for obtaining a direct current component in either direction in the delivered current.

A better understanding of my invention, together with other and further objects thereof, will be obtained from the following description taken in connection with the accompanying drawing and those features which I consider novel and patentable and within the scope of my invention will be pointed out with more particularity in the appended claims.

In the drawing I have illustrated a source of alternating current 10 adapted to supply a load 11 through electric discharge devices 12 and 13 and conductors 14 and 15. These electric discharge devices 12 and 13 may be of any of the several types well known in the art such, for example, as the pure electron discharge type or the vapor discharge type, but I prefer to use devices of the latter type provided with the usual anode and cathode and control grid. If desired, these discharge devices may be combined within a single envelope. As is well understood by those skilled in the art the control grid of such devices operates to determine the anode potential at which a discharge is initiated in the device but has no control in the stopping of the discharge which can be interrupted only by reducing the potential of the anode.

As shown in the drawing the devices 12 and 13 are connected in parallel and in series with the conductor 14. These devices are connected in opposition; that is, the anode of the device 12 is connected to the cathode of the device 13 and vice versa. A grid circuit is provided for the grids of each of these devices connected to their corresponding cathodes and including two independently adjustable sources of control potential. A unidirectional bias potential is supplied to the grids of the devices 12 and 13 from potentiometers 16 and 19 provided with adjustable connections 17 and 20 and energized by bias batteries 18 and 21 respectively. Included in these grid circuits are also the secondary windings 22 and 23 of transformers 24 and 25 respectively. The primary windings 26 and 27 of these transformers are energized in common from the secondary winding 28 of a phase-shifting device 29. While this phase shifting device is illustrated as comprising a distributed stator winding 29 energized by means of three-phase alternating current source 30 and a rotatable member provided with a single phase secondary winding 28, it will be obvious to those skilled in the art that any other of the various arrangements for obtaining a phase-shift between a primary and a secondary potential may be substituted therefor without departing from my invention. The alternating current circuit 30 may be energized from any suitable source of alternating potential synchronous with that of the source 10 and, by way of example, I have illustrated it as energized directly from the source 10 through an impedance phase splitting circuit 31, an arrangement well known in the art.

The operation of the apparatus will be described in connection with the several objects that may be obtained. In case it is desired merely to control the magnitude of the alternating current delivered by the source 10, the connections 17 and 20 are so adjusted as to give the same negative bias upon the grids of the devices 12 and 13. The magnitude of this bias will of course depend upon the design of the devices 12 and 13, but should be such as to render these devices conducting whenever their anode potential is above the critical positive potential of the device. The phase-shifting device 29 is supplied with three-phase alternating current of the same frequency as that of the source 10 and the secondary winding 28 is so adjusted that the potential of the secondaries 22 and 23 is in phase with the anode potential of the corresponding discharge device. Under these conditions it is clear that alternating current will flow which is limited only by the capacity of the source 10 and the impedance of the load 11, the devices 12 and 13 each conducting alternate half cycles of the alternating current. If the winding 28 is now rotated so that the potential across the secondary windings of the transformers 24 and 25 lag the anode potentials of their corresponding devices, the devices 12 and 13 will not be rendered conducting until some time after their corresponding anodes have become positive and only a portion of each half cycle of alternating current will be conducted through these devices. That is, the effective alternating current is decreased.

It is also possible to operate this apparatus as a controlled rectifier adapted to deliver current in either direction. For example, assume that the connection 17 is so adjusted that the magnitude of the negative bias impressed upon the grid of the device 12 is greater than the maximum value of the alternating potential supplied by the transformer 24. In this case the device 12 will conduct no current, while the device 13 will conduct alternate half cycles as before so that only unidirectional current will flow in the circuit. The magnitude of this current can be controlled by varying the phase of the grid potential of the device 13 by means of the winding 28 as in the first case. Similarly by impressing a corresponding negative bias on the grid of the device 13 and adjusting the bias of the device 12 as in the first case unidirectional current will flow in the circuit in the opposite direction and the magnitude of this current may be controlled by the phase-shifting device 29.

For some purposes it may be desirable to have an unsymmetrical alternating current, that is, one in which either the positive or negative half cycles are greater than the other. This is equivalent to an alternating current with a superimposed direct current component. Such a current may be obtained by adjusting the grid bias of the devices 12 and 13 to unequal values, in which case the device with the smaller grid bias will become conducting earlier in its half cycle than will the other device, with the result that the half cycles of current flowing through this device will be larger than those through the other device and the resulting current will have a direct current component. This method of controlling the conductivity of an electric valve is utilized in the arrangements illustrated in United States Letters Patents Nos. 1,654,937 granted January 3, 1928, upon the application of H. de B. Knight and 1,655,040 granted January 3, 1928, upon the application of E. F. W. Alexanderson to which reference is made for a detailed explanation. It is, of course, obvious that the magnitude of this current may also be controlled by the phase shifting device 29 and that the direct current component may be made to flow in either direction by the proper adjustment of the connections 17 and 20.

While I have shown and described what I at present consider the preferred embodiment of my invention, it will be obvious to those skilled in the art that various changes and modifications may be made without departing from my invention and I, therefore, aim in the appended claims to cover all such changes and modifications as fall within the true spirit and scope of my invention.

I claim:

1. A control apparatus for an alternating current system including a source of supply and a load, comprising a pair of electric discharge devices connected in parallel and in opposition, serially connected in said system, each of said devices being provided with a control grid and means for impressing upon said grids independently variable potentials for independently varying the conductivity of said devices.

2. A control apparatus for an alternating current system including a source of supply and a load, comprising a pair of electric discharge devices connected in parallel and in opposition, serially connected in said system, each of said devices being provided with a control grid, means for impressing upon said grids potentials of simultaneously variable phase and other means for impressing upon said grids potentials of independently variable magnitude.

3. A control apparatus for an alternating current system including a source of supply and a load, comprising a pair of electric discharge devices connected in parallel and in opposition, serially connected in said system, each of said devices being provided with an anode, a cathode, and a control grid, and connections between the grids and cathodes of said devices including sources of independently variable unidirectional potential, and sources of alternating potential simultaneously variable in phase.

4. A control apparatus for an alternating current system including a source of supply and a load, comprising a pair of electric discharge devices connected in parallel and in opposition, serially connected in said system, each of said devices being provided with an anode, a cathode and a control grid, a variable resistor connected between the grid and cathode of each device, and bias batteries connected across said resistors, said connections between the grids and cathodes each including one winding of a transformer the other winding of which is connected to be energized from a source of potential of variable phase.

5. The method of controlling the flow of electric energy in an alternating current system including a pair of electric discharge devices connected in parallel and in opposition, said devices being provided with control grids, which consists in impressing upon said grids potentials simultaneously variable in phase, and in impressing upon said grids other potentials independently variable in magnitude.

In witness whereof, I have hereto set my hand this 25th day of August, 1930.

HAROLD T. MASER.